US006389299B1

(12) United States Patent
Park

(10) Patent No.: US 6,389,299 B1
(45) Date of Patent: May 14, 2002

(54) SYSTEM AND METHOD FOR INTERFACING A CORDLESS HANDSET WITH A MAIN TELEPHONE SET IN A RADIO SWITCHING SYSTEM

(75) Inventor: Kyu-Hee Park, Kumi-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/470,869

(22) Filed: Dec. 23, 1999

(30) Foreign Application Priority Data

Dec. 30, 1998 (KR) .......................................... 98-60862

(51) Int. Cl.$^7$ ................................................ H04Q 7/26
(52) U.S. Cl. ....................................... 455/554; 455/463
(58) Field of Search ................................ 455/461, 462, 455/463, 464, 465, 550, 554, 575

(56) References Cited

U.S. PATENT DOCUMENTS 5,911,123 A * 6/1999 Shaffer et al. .............. 455/554

6,240,277 B1 * 5/2001 Bright ........................ 455/554

* cited by examiner

Primary Examiner—Thanh Cong Lee
(74) Attorney, Agent, or Firm—Dilworth & Barrese, LLP

(57) ABSTRACT

A private radio switching system comprises at least one cordless handset that interfaces with the main switching apparatus of the switching system via a base station connected with the main switching apparatus. The private radio switching system also includes at least one main telephone set having a plurality of functions. The main telephone set is not connected with the main switching apparatus and does not have a wired handset. Instead, the cordless handset and the main telephone set interface with each other. Data generated by the cordless handset relating to handset operations is transmitted to the main telephone set by infrared ray (IR) or by other wireless data communication. The main telephone processes the data and displays a message on the display of the main telephone set that corresponds to the operational data. Data entered by the telephone main set is transmitted to the cordless handset by IR or other wireless data communication. The cordless handset is operated according to the data entered at the main handset.

9 Claims, 2 Drawing Sheets

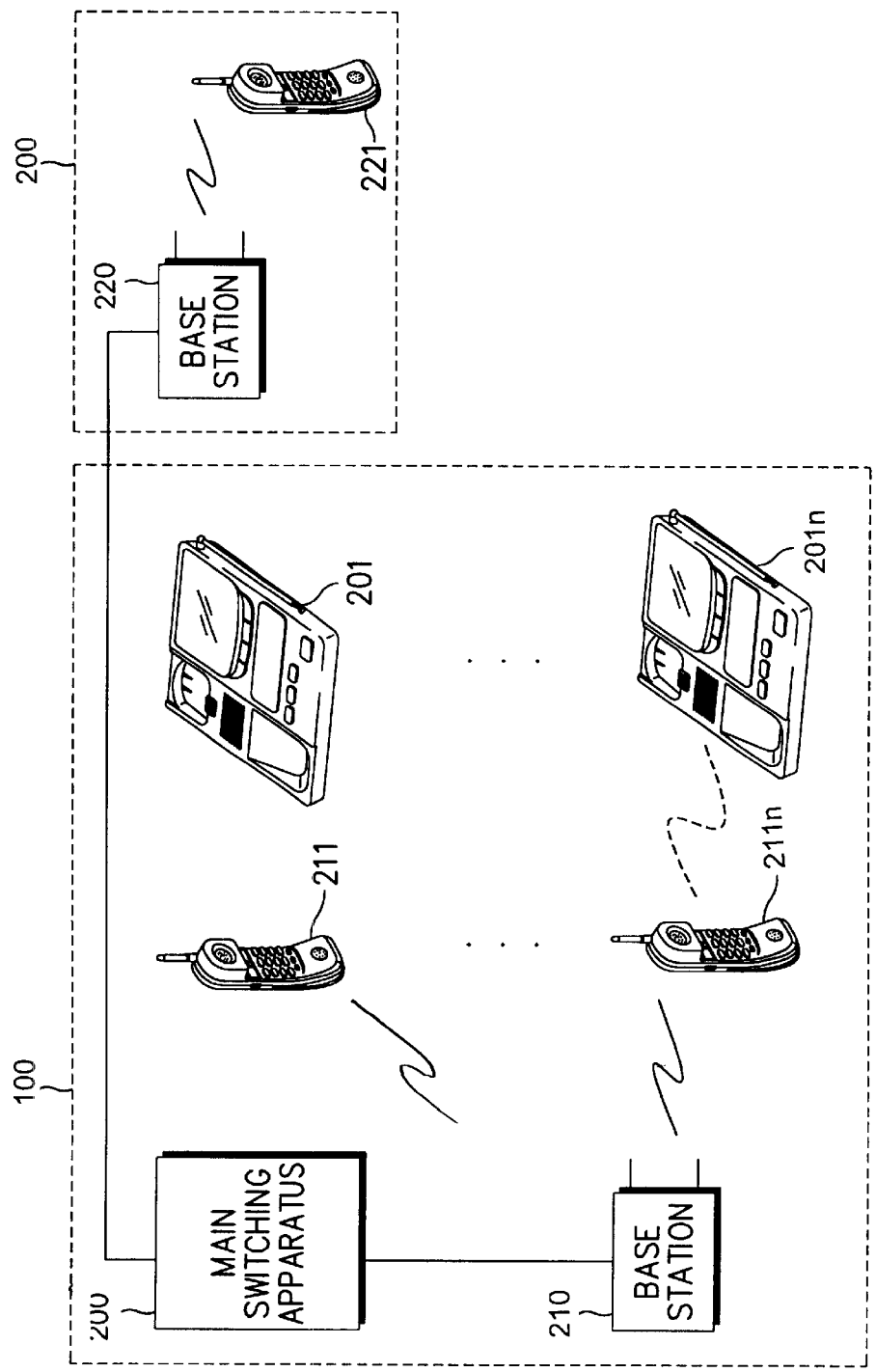

Figure 1:
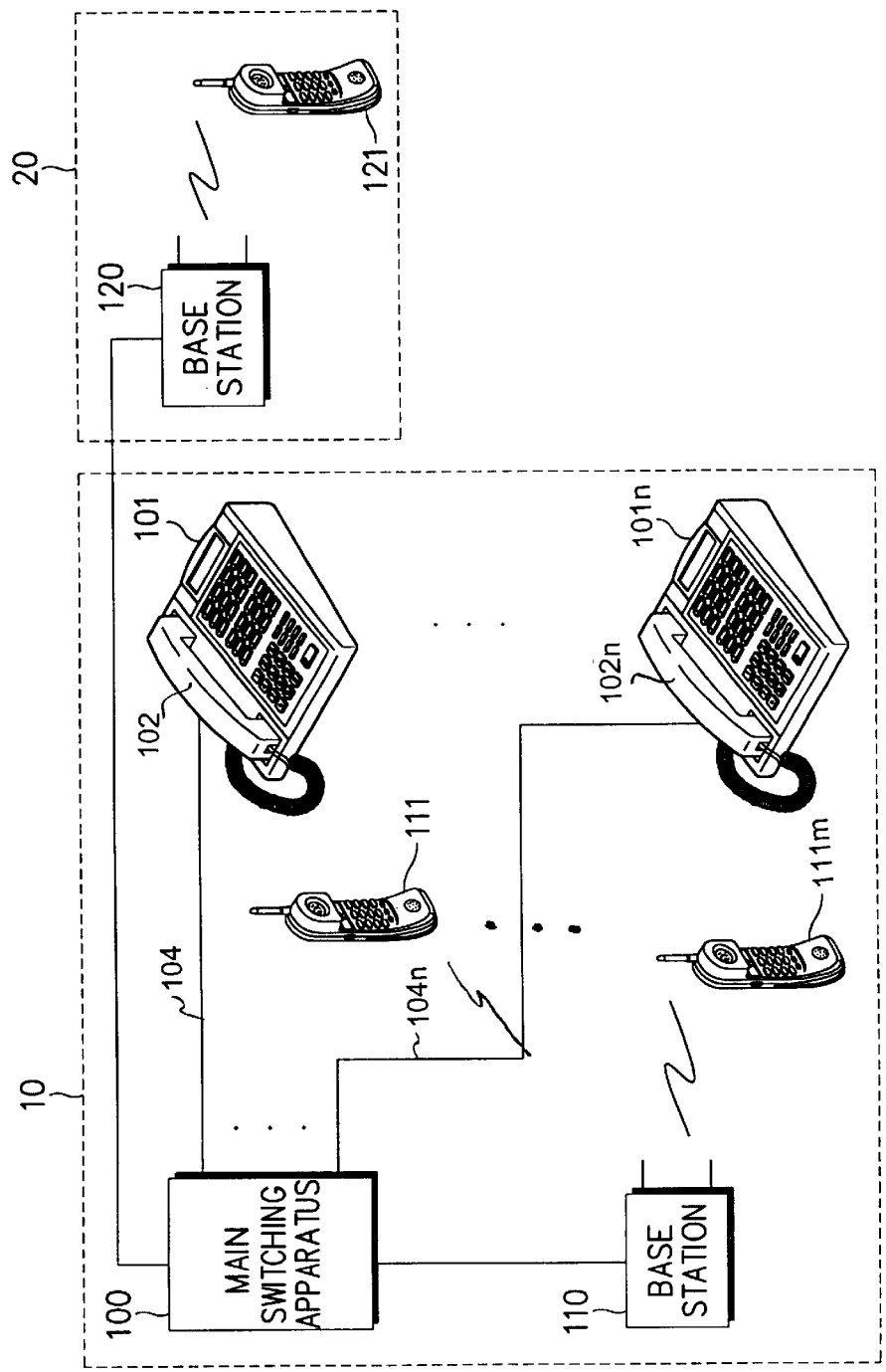

SYSTEM AND METHOD FOR INTERFACING A CORDLESS HANDSET WITH A MAIN TELEPHONE SET IN A RADIO SWITCHING SYSTEM

BACKGROUND OF THE INVENTION

1. Field of the Invention

The present invention relates to a private radio switching system, and more particularly to a system and method for connecting a cordless handset with a main telephone set.

2. Description of the Related Art

FIG. 1 is a known private radio switching system 10, 20. The system comprises a main switching apparatus 100, a plurality of base stations 110, 120, a plurality of main telephone sets 101–101n, and a plurality of cordless handsets 111–111m, 121. The main switching apparatus 100 is connected with the main telephone sets 101–101n by wires 104–104n. Communication with the cordless handsets 111–111m, 121 is through the base stations 110, 120. Since the cordless handsets 111–111m, 121 are not linked with the main telephone sets 101, 101n, the main telephone sets must be provided with a separate wired handset 102–102n. In addition, the absence of a link between the cordless handsets and the main telephone sets makes it impossible for the cordless handsets 111–111n, 121, which have a limited number of functions, to utilize the many additional functions typically supported by the main telephone sets 101–101n, 121.

SUMMARY OF THE INVENTION

It is an objective of the present invention to provide a system and method for utilizing a main telephone set to expand the functions of a cordless handset in a private radio switching system.

It is another objective of the present invention to provide a system and method for interfacing the main telephone set with the cordless handset in a private radio switching system so that the main telephone set need not be connected with the main switching apparatus.

According to the present invention, a private radio switching system comprises at least one cordless handset that interfaces with the main switching apparatus of the switching system via a base station connected with the main switching apparatus. The private radio switching system also includes at least one main telephone set having a plurality of functions. The main telephone set is not connected with the main switching apparatus and does not have a wired handset. Instead, the cordless handset and the main telephone set interface with each other. Data generated by the cordless handset relating to handset operations is transmitted to the main telephone set by infrared ray (IR) or by other wireless data communication. The main telephone processes the data and displays a message on the display of the main telephone set that corresponds to the operational data. Data entered by the telephone main set is transmitted to the cordless handset by IR or other wireless data communication. The cordless handset is operated according to the data entered at the main handset.

BRIEF DESCRIPTION OF THE ATTACHED DRAWINGS

The present invention will now be described more specifically with reference to the attached drawings in which:

FIG. 1 is a block diagram illustrating the structure of a conventional private radio switching system; and FIG. 2 is a block diagram of a private radio switching system according to an embodiment of the present invention.

DETAILED DESCRIPTION OF THE PREFERRED EMBODIMENT

FIG. 2 is an embodiment of a private radio switching system 100, 200 according to the present invention. Referring to FIG. 2, cordless handsets 211–211n are connected with respective main telephone sets 201–201n through radio communication. Cordless handsets 211–211n also communicate with a main switching apparatus 200 through a radio base station 210. Main telephone sets 201–201n are not connected with the main switching apparatus 200. The main telephone sets 201–201n support a number of functions. The main telephone sets 201–201n have a display device to display messages received from the cordless handset 211–211n and a plurality of keys used to invoke the functions. Each main telephone set 201–201n transmits data entered by its keys to one of the cordless handsets 211–211n, or receives data generated by one of the cordless handset 211–211n. The data transfer between a main telephone set 201–201n and its respective cordless handset 211–211n is by means of IR communication, RF (Radio Frequency) communication, or by contacting input/output ports.

In an example of the operation of the system, a phone number may be dialed using the keys of the main telephone set, such as set 201, instead of the keys of the associated cordless handset 211. The main telephone set 201 transmits the data representing the phone number to the cordless handset 211 (as noted above, by IR or RF communication, or contacting of input/output ports). The cordless handset 211 in turn transmits data representing the dialed phone number to the base station 210 and to the main switching apparatus 200. In addition, the cordless handset 211 may perform various additional functions according to key data entered by operating the keys of the main telephone set. For example, the phone number to be dialed may be accessed through a stored directory of numbers programmed in the main telephone, whereas such a directory function is not found in the cordless handset. The cordless handset 211 also transmits the data representing its present operational state to the main telephone set 201 for display on the display screen of the main telephone.

Thus, it is possible for the cordless handset to utilize the various additional functions of the main telephone set through the data communication between them. Further, since the main telephone set is not directly connected with the main switching apparatus by wire, its position may be readily changed. In addition, a separate handset need not be connected with the main telephone set by wire.

The portion of private switching system with reference number 200 shows that every cordless handset does not necessarily have a main telephone set associated with it. For example, cordless handset 221 either has no associated main telephone set or may be too far from the main telephone set for communication. Thus, cordless handset 221 interfaces by radio communication with base station 220 and is limited to those functions supported by the cordless handset 221.

While the present invention has been described in connection with specific embodiments accompanied by the attached drawings, it will be readily apparent to those skilled in the art that various changes and modifications may be made thereto while remaining within the scope of the present invention.

What is claimed is:

1. A method of communicating via a private radio switching system which comprises a cordless handset for communicating with a main switching apparatus of the switching system via a base station, and a main telephone set having a display and a plurality of functions, the method comprising the steps of:

transmitting operational data generated by the cordless handset to the main telephone set by radio communication;

displaying a message on the display of the main telephone set that corresponds to the operational data;

transmitting data entered at the telephone main set to the cordless handset by radio communication; and transmitting data from the cordless handset to the main switching apparatus according to the data entered at the main telephone set.

2. A method as in claim 1, wherein the radio communication is infrared (IR) data communication.

3. A method as in claim 1, wherein the radio communication is radio-frequency (RF) data communication.

4. A method of communicating via a private radio switching system which comprises a cordless handset for communicating with a main switching apparatus of the switching system via a base station, and a main telephone set having a display and a plurality of functions, the method comprising the steps of:

transmitting operational data generated by the cordless handset to the main telephone set by an output port on the handset in contact with an input port on the main telephone set;

displaying a message on the display of the main telephone set that corresponds to the operational data on the display of the main telephone set;

transmitting data entered at the main telephone set to the cordless handset by an output port on the main telephone set in contact with an input port on the cordless handset; and transmitting data from the cordless handset to the main switching apparatus according to the data entered at the cordless handset.

5. A private radio switching system comprising:

a cordless handset that supports radio communication;

a base station that interfaces with the cordless handset via radio communication;

a main telephone set having a display and a plurality of functions, the main telephone set operationally interfacing with the cordless handset, the main telephone set receiving input generated by the handset via the operational interface and displaying a message on the display corresponding to the state of the cordless handset, the main telephone set outputting data entered at the main telephone set to the cordless handset via the operational interface; and a main switching apparatus that electronically interfaces with the base station, the main switching apparatus receiving switching signals transmitted by the cordless handset via the base station, the switching signals generated by the cordless handset according to the data received from the main telephone set.

6. A system as in claim 5, wherein the operational interface between the cordless handset and the main telephone set is by radio communication.

7. A system as in claim 6, wherein the radio communication is via infrared communication.

8. A system as in claim 6, wherein the radio communication is via radio-frequency communication.

9. A system as in claim 5, wherein the operational interface between the cordless handset and the main telephone set is comprised of input and output data ports on the cordless handset that contact, respectively, output and input data ports on the main telephone set.

* * * * *